Sept. 28, 1948.  W. S. MASTER ET AL  2,450,012
VOLTAGE REGULATOR
Filed Sept. 30, 1944
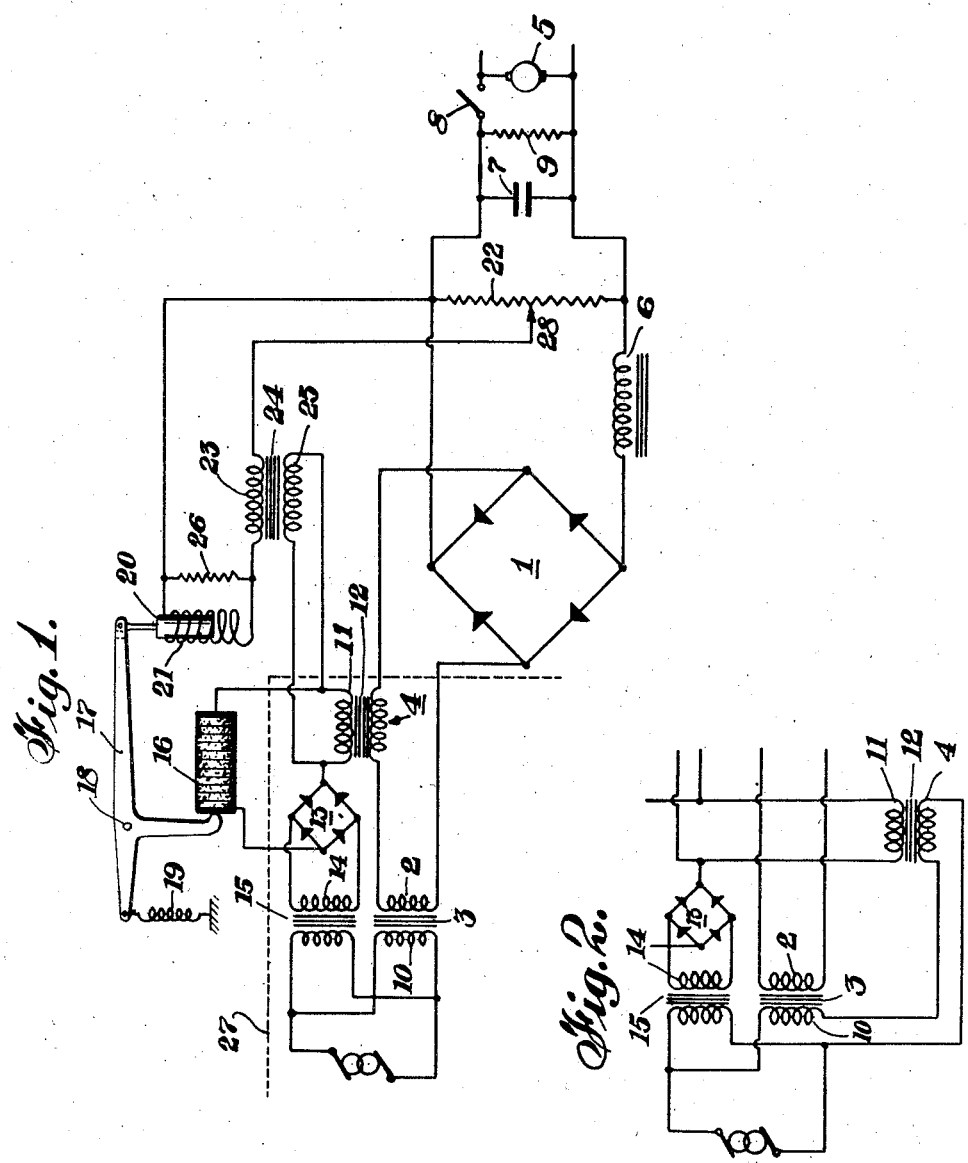
INVENTORS
WARREN S. MASTER
EDMUND ENGELMAN
BY
C. H. Suydam
AGENT Patented Sept. 28, 1948

2,450,012

UNITED STATES PATENT OFFICE 2,450,012

VOLTAGE REGULATOR

Warren S. Master, Rutherford, N. J., and Edmund Engelman, Elmhurst, N. Y., assignors to Federal Telephone and Radio Corporation, New York, N. Y., a corporation of Delaware Application September 30, 1944, Serial No. 556,584

4 Claims. (Cl. 175—363)

This invention relates to voltage regulation and in particular to the self-regulation of rectifier systems for converting alternating current into unidirectional or direct current.

An object of the invention is to provide an improved circuit arrangement for voltage regulators.

Another object of the invention is to provide an improved circuit arrangement for the self-regulation of rectifier systems.

Still another object of the invention is to provide a regulating system which maintains a substantially constant output voltage irrespective of variations in either load or in supply voltage.

A particular object of the invention is to provide a regulating means which is energized from a power source substantially independently from a second power source supplying a rectifier whose output voltage is to be regulated.

A further object of the invention is to provide a voltage regulation system which is substantially free from hunting effects.

Other objects and advantages of our invention will be apparent from the following description and accompanying drawing in which Fig. 1 illustrates the preferred embodiment of our invention; and Fig. 2 illustrates a modification of a portion of the circuit shown in Fig. 1.

Referring to Fig. 1, a full wave rectifier is illustrated by the reference character 1. Across one diagonal of the rectifier is connected an alternating current input circuit comprising the secondary winding 2 of an input transformer 3 and the alternating current winding of a saturable core reactor 4. Across the opposite diagonal of the rectifier is connected the output or load circuit illustrated, for example, as a motor 5. In order to smooth out the rectified pulses and produce a more nearly constant direct current, a filter consisting of a reactor 6 and a capacitor 7 is included in output circuit. The load may be connected or disconnected from the output circuit of the rectifier by the switch 8. It is customary to employ a bleeder resistance 9 across the output circuit so that at times when the load is disconnected the rectifier will draw some current. Alternately the bleeder resistance may be connected between the rectifier and the filter. In the latter position the filter coil 6 does not carry the bleeder current and may be of reduced current carrying capacity. The primary winding 10 of transformer 3 is connected to a source of alternating current shown as an alternator. This source might be the A.-C. mains of a distribution system.

With the load connected and the rectifier in operation, the rectifier circuit as described so far would normally have a poor regulation. For example, if the load on the motor increased, more current would be drawn thereby, and this would result in a reduced output voltage at the rectifier terminals. If the load on the motor decreased the opposite effect would occur. In order to prevent the variation of output voltage with change in load it is customary to employ voltage regulators. Many types of voltage regulators are known but the regulator of our invention is an improvement on existing types. Not only will the regulator maintain a substantially constant output voltage with variations in load, but it will also correct for variations in the voltage of the line or alternator.

As above mentioned, the A.-C. winding of a saturable reactor 4 is connected in the alternating current input circuit of the rectifier. If the reactance of this reactor is made to increase with a decrease in load and decrease with an increase in load and the amount of the increase or decrease properly controlled, it will be seen that any variation in load will be accompanied by a suitable variation in the output voltage and thereby maintain said voltage substantially constant. For example, if the load should increase and the output voltage decrease, a decrease in the reactance of the reactor 4 would permit more current to flow from the secondary winding 2. This increased flow of current would result in an increased output voltage. To obtain this decrease in reactance a saturating winding 11 is wound on the same core as the A.-C. winding, and means are provided for increasing the current through this winding 11. This reduces the permeability of the core 12 and decreases the reactance of the reactor.

The current for energizing winding 11 is obtained, as shown in Fig. 1, by a second full wave rectifier 13, the alternating current input for this rectifier preferably being obtained from the secondary winding 14 of the transformer 15. Although the transformer 15 is illustrated as a separate unit from that of transformer 3, the two transformers could be combined into a single unit. In this case the transformer supplying rectifiers 1 and 13 would comprise a single primary and two separate secondaries, these latter being equivalent to the two secondaries 2 and 14 of Fig. 1. Other forms of direct current supply, such as a battery, could be employed in place of rectifier 13. In series with the direct current output of the rectifier and the winding 11 is a variable resistance 16 shown in the figure as a carbon pile. Pressure on the carbon pile discs is maintained by the bell crank 17 pivoted at 18. The bell crank is held in its normal position by the tension spring 19 balanced against the magnetic pull on the plunger 20, the latter being controlled as to position by the current flowing in the energizing coil 21. The coil 21 is energized from the voltage developed in a voltage divider or potentiometer 22 connected across the output circuit of the rectifier 1. Alternately, the potentiometer could, in the absence of the choke 6, be connected directly across the output terminals of the rectifier. A resistance 26 is connected across the coil 21 and acts as a damping element.

In series with the coil 21 and its energizing source is the primary 23 of a transformer 24. This transformer is commonly known as an antihunting transformer. The secondary 25 of this transformer is connected across the terminals of the coil 11. In the above described illustration wherein the load on the output of the rectifier increased and it became necessary to decrease the reactance of the reactor 4, the decrease in said reactance is brought about by a decrease in the resistance of the carbon pile 16 which permits more current to flow from the rectifier 13 through the coil 11. The decreased voltage across the rectifier output causes less current to flow through the winding 21, thus reducing the pull on the plunger 20. The action of spring 19 acting through the bell crank levers 17 compresses the carbon pile as required. The action of this regulating mechanism is very rapid, that is, it causes the carbon pile resistance to vary practically simultaneously with variation in load voltage. The increased current which flows through the saturating coil 11 as the result of the reduction in resistance of the resistor 16, builds up slowly due to the back E. M. F. of the coil. The reactor, in attempting to maintain constant output voltage, tends to permit an increase in the current flow beyond that which would be required to bring the output voltage to normal. When the current in coil 11 finally reaches the desired value the resistance of the resistor 16 has become too low and the current in coil 11 continues to increase. This results in hunting of the regulating mechanism. To avoid this hunting the transformer 24 with its primary 23 and secondary 25 is employed. For example, when the decrease in current through the coil 21 takes place there is a change in current in the primary 23. This induces a voltage in the secondary 25 which in turn causes a momentary flow of current in the coil 11 in the proper direction to speed up the regulating action. Of course the polarities of the induced voltages across the coil 25 must be such as to cause the current to flow through coil 11 in the required direction. The ratio of turns between the primary and secondary windings of transformer 24 or the coupling therebetween may be adjusted to produce the desired amount of current flow.

Returning now to the direct current supply for energizing winding 11, it will be noted that it is independent of the direct current output of rectifier 1. This is an important feature of our invention. If the current for winding 11 were taken from the D.-C. output voltage, it would be an additional load on the main rectifier. Furthermore, any variation in output voltage would be opposite to that required for producing the desired current variation in winding 11. For example, as mentioned above, a decrease in the output voltage causes a decrease in the resistance of the carbon pile and a certain current increase in winding 11. This decreases the reactance of the reactor 4 and increases the output voltage. However, if the voltage supplying current to the winding 11 tended to decrease with the original decrease in output voltage it will be seen that a greater reduction in carbon pile resistance would be required than if the voltage supplying current to the pile and winding 11 remained substantially constant as in our invention.

Referring to Fig. 2 we have shown an alternate circuit arrangement to that portion of the circuit of Fig. 1 which occurs below and to the left of the dotted line 27. In Fig. 2 the saturable reactor 4 is placed in the primary circuit of the transformer 3, in series with the winding 10. This location for the reactor has the advantage that the size of the transformer 3 may be reduced since its secondary 2 does not have to supply the voltage which is consumed in the reactor 4. In this case, the input circuit for rectifier 1 is considered to include the primary 10 of transformer 3 and also the reactor 4. Operation of the regulating circuits is not changed except in so far as certain circuit constants may be affected. The tension spring 19 might require a different adjustment and a different turn ratio of the windings 23 and 25 of transformer 24 may be required. The adjustable contact 28 on potentiometer 22 might require a different setting.

The contact 28 also permits the voltage of the output circuit to be adjusted over a range of values. For example, in Fig. 1, if it is desired to increase the output voltage, the contact 28 is moved upward the required amount, thereby reducing the amount of the potentiometer resistance included in the control circuit. This reduces the voltage applied to coil 21 and also the pull on plunger 20. The attendant reduction in resistance of the carbon pile 16 permits more current to flow in the saturating winding 11 thus reducing the reactance of the reactor 4. This increases the A.-C. voltage applied to the rectifier and consequently increases the D.-C. output voltage. The output voltage can be reduced by an opposite adjustment of the contact 28.

While we have disclosed the principle of our invention in connection with only two embodiments thereof, it will be understood that these embodiments are given by way of example only and not as limiting the scope of our invention as set forth in the objects and the appended claims.

What is claimed is:

1. A self-regulating rectifying system for converting alternating current into direct current, comprising a rectifier having an alternating current input circuit and a direct current output circuit, a power source connected to said input circuit, a saturable core reactor in said input circuit, and regulating means for increasing or reducing the reactance of said reactor in accordance with the rise or fall respectively of the potential across said output circuit, said regulating means comprising a saturating winding on said core, a variable resistor and a current supply, all connected in series, means for varying the resistance of said resistor in response to potential variations of said output circuit, whereby the direct current potential of said output circuit remains substantially constant, said last means comprising a voltage responsive coil and a potential divider connected across said output circuit, and an accelerating means, said accelerating means comprising a transformer having primary and secondary windings, said primary winding being connected in series with said voltage responsive coil and said potential divider, and said secondary coil being connected across said saturating winding.

2. Voltage regulating system comprising, in combination, a source of alternating current power, a load circuit, a rectifying means intermediate said power source and said load circuit, a saturable core reactor having an alternating current winding serially connected between said power source and said load circuit, and a saturating winding, a source of direct current, means including a variable resistance connecting said direct current source to said saturating winding, means responsive to the value of voltage across said load circuit for varying the value of said variable resistance, and means for introducing transient changes in the saturation of said reactor in response to transient changes in voltage across said load circuit and independently of said voltage value responsive means.

3. Voltage regulating system comprising, in combination, a source of alternating current power, a load circuit, a rectifier intermediate said power source and said load circuit, a saturable core reactor having an alternating current winding serially connected between said power source and said rectifier, and a saturating winding, a source of direct current, means including a variable resistance connecting said direct current source to said saturating winding, means responsive to the value of voltage across said load circuit for varying the value of said variable resistance, and means responsive to transient changes in the voltage across said load circuit and introducing a transient potential in said saturating winding in a direction to accelerate the changes in current in said winding produced by said voltage value responsive means.

4. The combination according to claim 3, in which said last means comprises a transformer having its primary winding connected across said direct current load circuit and its secondary winding connected across said saturating winding.

WARREN S. MASTER.
EDMUND ENGELMAN.

REFERENCES CITED

The following references are of record in the file of this patent:

UNITED STATES PATENTS

| Number | Name | Date |
|---|---|---|
| 1,933,858 | Keller | Nov. 7, 1933 |
| 1,943,464 | Ohlsen | Jan. 16, 1934 |
| 2,223,974 | Thompson | Dec. 3, 1940 |
| 2,346,997 | Priest | Apr. 18, 1944 |